United States Patent [19]

Sasaki et al.

[11] Patent Number: 4,989,947
[45] Date of Patent: Feb. 5, 1991

[54] PLASTIC OPTICAL FIBERS

[75] Inventors: Isao Sasaki; Kozi Nishida; Masaru Morimoto; Hisao Anzai; Hideaki Makino, all of Hiroshima, Japan

[73] Assignee: Mitsubishi Rayon Co., Ltd., Tokyo, Japan

[21] Appl. No.: 296,293

[22] Filed: Jan. 10, 1989

Related U.S. Application Data

[63] Continuation of Ser. No. 7,165, Jan. 27, 1987, abandoned.

[30] Foreign Application Priority Data

Jan. 27, 1986 [JP] Japan ................................. 61-13790

[51] Int. Cl.$^5$ .......................... B32B 27/00; G02B 6/00
[52] U.S. Cl. ................. 350/96.34; 350/96.23; 428/373; 428/375; 428/394; 428/395
[58] Field of Search ............... 428/373, 375, 392, 394, 428/395; 350/96.34, 96.30, 96.23, 96.29

[56] References Cited

U.S. PATENT DOCUMENTS

| | | | |
|---|---|---|---|
| 2,146,209 | 2/1939 | Graves | 260/2 |
| 3,026,307 | 3/1962 | Gorham et al. | 526/329.7 |
| 3,930,103 | 12/1975 | Chimura et al. | 428/378 X |
| 3,999,834 | 12/1976 | Ohtomo et al. | 428/378 X |
| 4,246,374 | 1/1981 | Kopchik | 525/379 |
| 4,255,322 | 3/1981 | Kopchik | 524/322 |
| 4,384,097 | 5/1983 | Wingler et al. | 526/329.7 |
| 4,816,524 | 3/1989 | Anzai et al. | 525/330.5 |

FOREIGN PATENT DOCUMENTS 0155567 9/1985 European Pat. Off. .
0200530 11/1986 European Pat. Off. .

*Primary Examiner*—Lorraine T. Kendell
*Attorney, Agent, or Firm*—Sughrue, Mion, Zinn, Macpeak & Seas

[57] ABSTRACT

A core-clad plastic optical fiber is described, comprising a polyglutarimide series polymer having a polymeric structural unit represented by formula (I)

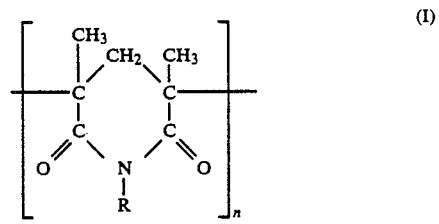

wherein R represents a hydrogen atom, an alkyl group, a cycloalkyl group, or an aromatic group and n represents a positive integer, having a thermal deformation temperature of at least 120° C. as a core, and an organic polymer having a refractive index lower than the refractive index of the core as a clad layer, said plastic optical fiber having the characteristic that the light transmission loss measured at 655 nm is not more than 500 dB/km.

7 Claims, 2 Drawing Sheets

PLASTIC OPTICAL FIBERS

This is a continuation of application Ser. No. 07/007,165, filed Jan. 27, 1987, and now abandoned.

FIELD OF THE INVENTION

This invention relates to a plastic optical fiber having excellent light-transmission characteristics and excellent heat resistance. More particularly, the invention relates to a core-clad type plastic optical fiber using a polyglutarimide polymer as core component.

BACKGROUND OF THE INVENTION

As light-transmitting fibers which have hitherto been developed, optical fibers using inorganic glass as the core and having excellent light-transmitting property are known, and the development of uses of the optical fibers is being advanced mainly in the field of light transmission by effectively utilizing such excellent light-transmission characteristics.

However, inorganic glass series optical fibers have disadvantages such as that the workability is poor, the flexibility is low, and the bending strength is so weak that they may be easily broken or deformed in the case of repeated bending. Accordingly, the development of optical fibers having no such disadvantages has been desired.

On the other hand, plastic optical fibers using a plastic such as polystyrene, polycarbonate, polymethyl methacrylate, etc., have features such as being high in flexibility and excellent in workability, and although the light-transmission characteristics thereof are inferior to those of inorganic glass optical fibers, the development of the uses of plastic optical fibers is being advanced mainly for the utilization thereof in the field of relatively short light-transmission distances, such as use for motor instruments or parts, use in office automation equipment, use between office automation equipment, etc.

In these plastic optical fibers, optical fibers using polymethyl methacrylate as the core and having excellent light-transmission characteristics of not more than 500 db/km, in particular not more than 200 db/km have been developed and since the appearance of such plastic optical fibers, the development of applications for them has been rapidly expanded.

However, the usable upper temperature limit of the plastic optical fibers using a polymethyl methacrylate resin as the core at ordinary use is as low as lower than 85° C., since the thermal deformation temperature of polymethyl methacrylate itself is about 100° C. Accordingly, in the case of using the optical fibers using a polymethyl methacrylate resin as the core, the atmospheric temperature must be lower than 100° C., and such plastic optical fibers are unsatisfactory in heat resistance for use as optical fibers for communication among instruments in motor vehicles or optical fibers for use in office automation equipment. Therefore, the development of plastic optical fibers having heat resistance to temperatures of not lower than 120° C., and more preferably not lower than 130° C., and also having light transmission characteristics as good as those of polymethyl methacrylate series optical fibers has been keenly desired.

A plastic optical fiber having high heat resisting characteristics is disclosed in European Patent Publication (unexamined) No. 155,567. The optical fiber is a core-clad type optical fiber using a polyglutarimide series polymer, but has the following disadvantage. That is, a light emitting element which is advantageously used as a light source for plastic optical fibers has the main wavelengths of emitted light in the range of from 400 nm to 700 nm, but optical fibers using a polyglutarimide series polymer as the core are not so good in light transmission characteristics for light in the 400 nm to 700 nm range. For example, the light transmission loss of the aforesaid plastic optical fibers for light of 655 nm are 800 to 1,500 dB/km, which is larger than the light transmission loss (100 to 500 dB/km) of a polymethyl methacrylate series optical fibers for light of 655 nm. Furthermore, according to the inventors' investigations, it has been confirmed that plastic optical fibers having polyglutarimide as the core which have hitherto been developed have a property of rapidly increasing the light transmission loss for light of 400 to 700 nm over 5000 dB/km when the optical fibers are exposed to a high temperature atmosphere of higher than 100° C., and hence the aforesaid plastic optical fibers are not yet fully sufficient for many uses as plastic optical fibers having high heat resistance and good light-transmission characteristics.

SUMMARY OF THE INVENTION

An object of this invention, therefore, is to provide plastic optical fibers meeting the above-described desired characteristics.

Other object of this invention is to provide plastic optical fibers having excellent light-transmission characteristics and high heat resistance.

It has now been found that the aforesaid objects can be attained by the invention described below.

That is, according to this invention, there is provided a core-clad type plastic optical fiber comprising a polyglutarimide series polymer having a polymeric structural unit represented by formula (I)

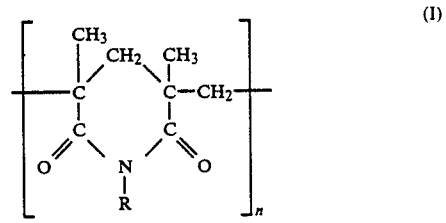

wherein R represents a hydrogen atom, an alkyl group, a cycloalkyl group, or an aromatic group and n represents a positive integer,
having a thermal deformation temperature of at least 120° C. as a core, and an organic polymer having a refractive index lower than the refractive index of the core as a cladding layer, said plasitc optical fiber having the characteristic that the light transmission loss for light of 655 nm is not more than 500 dB/km.

According to a specific embodiment of this invention, a core-clad type plastic optical fiber is provided having excellent heat resistance characteristics such that even when the optical fiber is exposed to a high temperature atmosphere of 130° C. for 1,000 hours, the light-transmission loss for light of 655 nm is not more than 500 dB/km.

According to another embodiment of this invention, a core-clad plastic optical fiber is provided comprising the polyglutarimide series polymer, said polyglutarimide series polymer being prepared by reacting a polymethyl methacrylic polymer having a heat coloring degree, $YI_S$ value, obtained by the method described hereinbelow, of at most 3, preferably 0.1 to 1 and an amine represented by formula (II)

$$R'-NH_2 \qquad (II)$$

wherein R' represents a hydrogen atom, an alky group, a cycloalkyl group, or an aromatic group,
the polymethyl methacrylic polymer containing preferably not more than 500 ppm, more preferably not more than 200 ppm, particularly more preferably not more than 100 ppm, measured by the gas chromatography shown hereinbelow, of impurities changing yellow colored materials by the reaction of the amine shown by aforesaid formula (II).

DETAILED DESCRIPTION OF THE INVENTION

Figure 1:
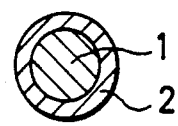
FIG. 1 is an enlarged sectional view showing an example of the plastic optical fiber of this invention.

For producing a polymethyl methacrylic polymer which is used as the core of plastic optical fibers the polymerization is usually performed in a completely closed system in order to avoid the polymethyl methacrylic polymer formed from being contaminated. Such a polymerization method for obtaining polymethyl methacrylic polymer is illustrated, for example, in U.S. Pat. Nos. 3,930,103, 3,993,834, etc. The polymerization temperature for the polymethyl methacrylic polymer described in the aforesaid patents is from 120° C. to 160° C. and a continuous bulk polymerization method is employed as the polymerization method. However, it is difficult to obtain a polymethyl methacrylic polymer having a $YI_S$ value of not more than 3 by employing the aforesaid polymerization method. Also, a core-clad plastic optical fiber using a polyglutarimide polymer prepared by reacting the polymethyl methacrylic polymer having such a $YI_S$ value and an amine as the core shows a large light-transmission loss for light of 655 nm larger than 800 dB/km, and when such a plastic optical fiber is exposed to a high-temperature atmosphere of 130° C. for 1,000 hours, the light-transmission loss of the optical fiber for light of 655 nm is quickly increased to over 1,000 dB/km.

Because the polymethyl methacrylic polymer which causes the inconvenience as described above in the case of using for producing the polyglutarimide polymer as the core of plastic optical fibers contains not less than 500 ppm, as measured by gas chromatography, of impurities which react with an amine to form yellow colored materials.

Thus, it is preferred that the polyglutarimide polymer which is used for producing the plastic optical fiber of this invention is prepared by dissolving or dispersing a polymethyl methacrylic polymer having a content of impurities, determined by gas chromatography, of not more than 500 ppm, preferably not more than 200 ppm, and more preferably not more than 100 ppm, and having an intrinsic viscosity of 0.01 to 3.0 dl/g (measured in a dimethylformamide solution thereof at 25° C.) in, preferably, an organic solvent, reacting the polymethyl methacrylic polymer and the amine represented by formula (II) described above, preferably at a temperature of from 170° C. to 280° C., and then removing volatile components of the reaction system. According to the above-described method, the polymethyl methacrylic polymer having the $YI_S$ value of not more than 3, and particularly in the range of from 0.1 to 1, can be produced, and therefore, the polyglutarimide polymer prepared by reacting the polymethyl methacrylic polymer and the amine as described above can be effectively used as the core material for the plastic optical fibers of this invention.

On the other hand, when a polymethyl methacrylic polymer contains not less than 1,000 ppm of the impurities having the above-described undesirable property (measured by gas chromatography), a polymethyl methacrylic polymer having the $YI_S$ value of not more than 3 cannot be obtained under any reaction steps or reaction conditions selected. Therefore, the core-clad plasitc optical fiber using a polyglutarimide polymer prepared by reacting the polymethyl methacrylic polymer which contains a large amount of impurities and the amine as the core shows a light-transmission loss for light of 400 to 700 nm of not shorter than 800 dB/km.

Since the plastic optical fiber of this invention uses a polyglutarimide polymer produced from the reaction of a polymethyl methacrylic polymer having the $YI_S$ value of not more than 3, particularly of 0.1 to 1 and an amine represented by formula (II) as the core, the light-transmission loss for light of 655 nm is not more than 500 dB/km and when the plastic optical fiber is exposed to a high-temperature atmosphere, the light-transmission loss does not greatly increase.

A polymethyl methacrylic polymer having a low content of impurities as descried above can be obtained by dissolving monomer composition containing 75 wt. % or more of methyl methacrylate in an organic solvent and polymerizing it under the polymerization temperature of 60° C. to 140° C.

In particular, by dissolving the monomer composition in an organic solvent at a concentration of 50 to 80% by weight, polymerizing methyl methacrylate at temperature of 60° C. to 120° C. in the existence of a polymerization catalyst and a molecular weight controlling agent in such a manner that the polymerization ratio of methyl methacrylate becomes at least 60%, and then polymerizing it in the polymerization reaction range having the plug flow as shown in U.S. Pat. No. 3,252,950 at a temperature of 80° C. to 170° C. in such a manner that the polymerization ratio of methyl methacrylate becomes at least 90%, a polymethyl methacrylic polymer having a very low content of the impurities can be obtained.

It is preferred that the intrinsic viscosity of the polymethyl methacrylic polymer is from 0.01 dl/g to 3.0 dl/g in order to improve the fiber-forming property of the polyglutarimide polymer prepared using the polymethyl methacrylic polymer at the case of forming optical fiber. In addition, the fiber-forming property is necessary for preventing an increase of the light transmission loss based on the optical strain of the optical fiber obtained. The polymethyl methacrylic polymer in this invention is a homopolymer of methyl methacrylate or a copolymer of methyl methacrylate and other co-monomer such a acrylic acid esters, other methacrylic acid esters than methyl methacrylate, styrene, α-methylstyrene, etc. In the case of the copolymer of methyl methacrylate, it is preferred that the proportion of methyl methacrylate in the coplymer is at least about 75% by weight.

Acrylic acid esters for forming the copolymers include methyl acrylate, ethyl acrylate, butyl acrylate, cyclohexyl acrylate, benzyl acrylate, etc., and methacrylic acid esters for forming the copolymers include ethyl methacrylate, butyl methacrylate, cyclohexyl methacrylate, benzyl methacrylate, etc. These comonomers may be used singly or as a mixture of two or more thereof.

Organic solvent for use in the production of the polymethyl methacrylic polymer include aliphatic alcohols such as methanol, ethanol, propanol, isopropanol, etc., aromatic hydrocarbons such as benzene, toluene, ethylbenzene, xylene, etc., and ketones or ethers such as methyl ethyl ketone, tetrahydrofuran, dioxane, etc. These solvents may be used singly or as a mixture thereof.

As the amine shown by formula (II described above, which is used for producing a polyglutarimide polymer by the reaction with the polymethyl methacrylic polymer, there are methylamine, ethylamine, propylamine, cycloalkylamine, benzylamine, etc., when R' in the formula is an alkyl group. Also, there are compounds forming an alkylamine by thermal decomposition, such as dimethylurea, 1,3-diethylurea, 1,3-dipropylurea, benzylamine, etc. Furthermore, ammonia and amines of formula (II) wherein R' is an aromatic group, such as aniline, toluidine, trichloroaniline, etc., can be also used.

For the reaction for converting the polymethyl methacrylic polymer into the polyglutarimide polymer, it is preferred to react the polymethyl methacrylic polymer and the amine shown by formula (II) described above while in the state of being dissolved or dispersed in an organic solvent at a concentration of 30 to 80% by weight. The organic solvent for use in this case is the same as the solvent described above. In particular, by using a mixed solvent of an aromatic hydrocarbon such as toluene, xylene, etc., and an aliphatic alcohol, the polyglutarimide polymer having the higher heat resistance can be obtained. In this case, the ratio by weight of an aliphatic alcohol to an aromatic hydrocarbon is preferably from 1/99 to 80/20.

As the aliphatic alcohol for use in this case, methanol is preferred.

Figure 4:
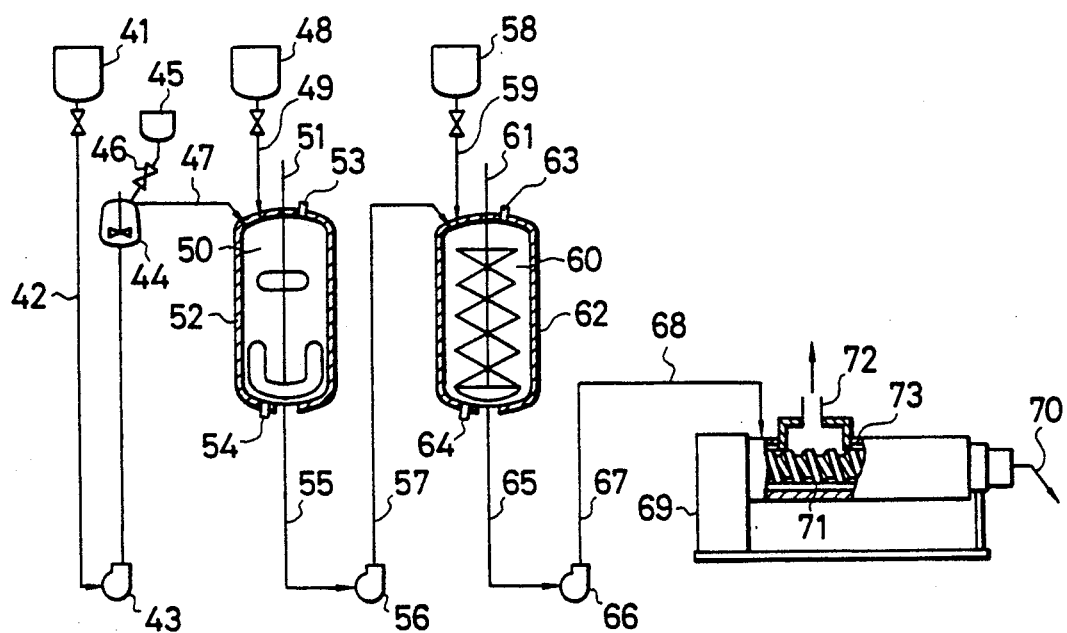
FIG. 4 is a schematic view showing an apparatus for producing the polyglutarimide polymer which is used as the core of the plastic optical fiber of this invention.

FIG. 4 is a schematic view showing a typical apparatus for advantageously producing the polyglutarimide polymer.

As shown in FIG. 4, a non-polymerizing solvent is sent from a solvent storage tank 41 through a line 42 into a solvent supply tank 44 by means of a pump 43, and after dissolving, if necessary, an antioxidant supplied from an antioxidant storage tank 45 through a line 46 into the solvent supply tank 44, the solvent is supplied to a polymer dissolving tank 50 through a line 47.

On the other hand, a polymethyl methacrylic polymer is supplied from a pellet storage tank or polymer solution storage tank 48 through a line 49 into the polymer dissolving tank 50. The polymer dissolving tank 50 is equipped with a stirrer 51 and a jacket 52 and a heat medium is circulated through via openings 53 and 54. The dissolved polymer in the polymer dissolving tank 50 is sent through a line 55 and a line 57 into a reaction tank 60 by means of a pump 56 and is reacted with an imidating material (which has formula II) supplied from an imidating material storage tank 58 through a line 59. The reaction thank 60 is equipped with a spiral ribbon type stirrer 61 and a jacket 62, and a heat medium is circulated through via openings 63 and 64.

The reaction product formed in the reaction tank 60 is sent to a volatile material separator 69 through a line 65 and lines 67 and 68 by means of a pump 66 and after removing volatile matters therein, is discharged from a polymer outlet 70. The volatile material separator 69 is equipped with a screw 71, a vent 72, and a heating means 73.

The plastic optical fiber of this invention has a core-clad structure composed of a core 1 and a cladding 2 as shown in FIG. 1, and the optical fiber may be used as the core-clad structure itself, or may, if necessary, be combined with a protective layer or a coating layer using an organic polymer, or further may be used as a form of a product such as an optical fiber transmission line, an optical fiber cable, etc., together with a tension member such as polyester fibers, polyamide fibers, metal fibers, carbon fibers, etc.

Figure 2:
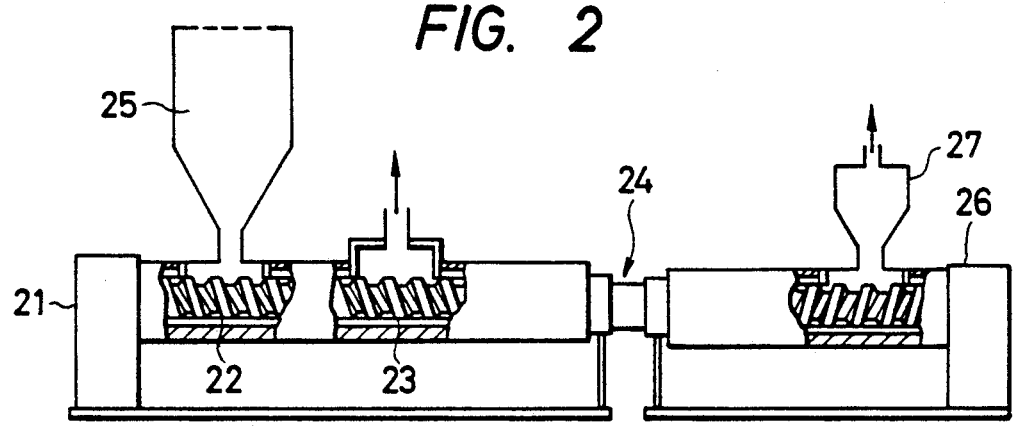
FIG. 2 is a partially opened side view showing an example of a melt spinning apparatus for forming the core-clad structure of the plastic optical fiber of this invention.

For forming the core-clad structure of the plastic optical fiber of this invention, a melt spinning apparatus as illustrated in FIG. 2 can be used. In FIG. 2, a numeral 21 shows a vent-type extruder (e.g., screw diamater 30 mm, screw length 720 mm, vent length 60 mm, vacuum vent 10 mm Hg, extruding temperature 230° C., vent temperature 250° C.) for supplying a core material. A numeral 22 is a screw in the extruder and a core material supplied from a hopper 25 is sent to a vent portion 23 as a molten state and is formed into a core by a composite spinning nozzle 24. In this case, the core material can be supplied in the form of dust free.

An extruder 26 is for supplying a cladding material and a cladding material is supplied from a hopper 27 and sent to the composite spinning nozzle 24, whereby the clad material is formed as cladding over the core described above. In this case, a hopper-vent system is employed and the cladding material from which volatile materials are removed at a reduced pressure of 10 mm $Hg_3$ is used.

Figure 3:
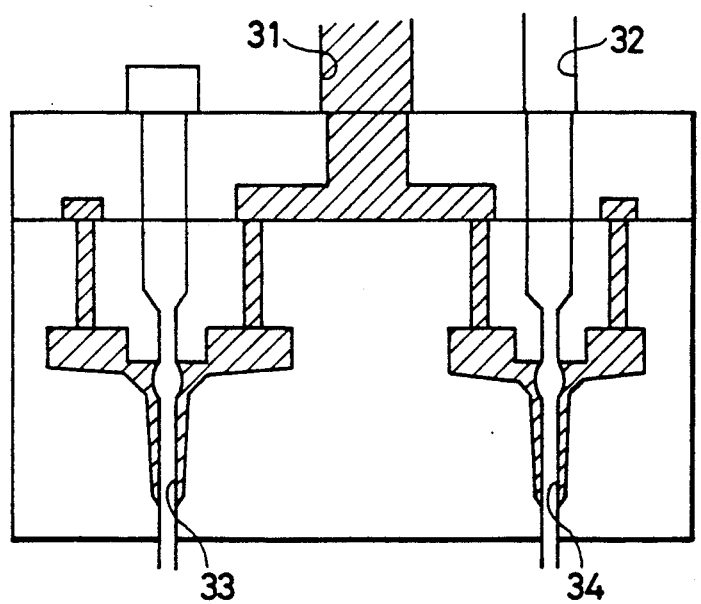
FIG. 3 is an enlarged schematic sectional view showing an example of a spinning nozzle portion for forming the core-clad structure of the plastic optical fiber of this invention.

FIG. 3 is a schematic sectional view showing an example of the composite spinning nozzle portion 24. As shown in FIG. 3, a cladding material is supplied from an inlet 31, a core material is supplied from an inlet 32, and they are spun through plural spinning nozzles 33, 34 to form optical fibers of a core-clad structure.

In addition, the melt spinning apparatus shown in FIGS. 2 and 3 is used for forming a core-clad structure only, but plastic optical fibers of this invention may be produced by using other melt spinning apparatus for forming, for example, a core-clad-protective layer three-layer structure, or other multi-layer structures. Furthermore, the plastic optical fibers of this invention may be formed by combining a melt spinning technique and a coating technique.

As the cladding material for forming the cladding layer of the polyglutarimide series optical fibers of this invention, a polymer having a refractive index of at least 0.01 lower than the refractive index of the polyglutarimide polymer is preferably used and a silicon resin or a fluorine-containing polymer is preferred as such a polymer.

Examples of particularly preferred fluorine-containing polymers include the homopolymer or copolymers of a fluorine-containing vinyl monomer and the homopolymers or copolymers of a fluorine-containing monomer such as vinylidene fluoride, tetrafluoroethylene, hexafluoropropylene, etc., represented by the following formulae (III) and (IV)

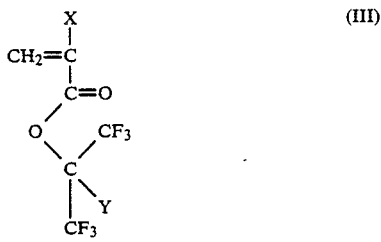

wherein Y represents a hydrogen atom or a fluoroalkyl group and X represents a hydrogen atom Or an alkyl group, and

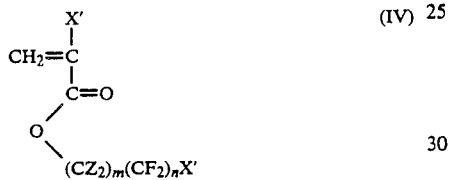

wherein X' represents a hydrogen atom, an alkyl group or a fluorine atom, Z represents a hydrogen atom or a fluorine atom, and m and n each represents a positive integer and preferably, m represents 1 to 6, and n represents 1 to 8.

Also, the plastic optical fibers of this invention may be formed by melt-spinnig the polyglutarimide polymer to form cores, coating the cores with a cladding material prepared by adding a crosslinking monomer and a photopolymerization initiator to the fluorine-containing monomer represented by formula (III) or (IV) described above, and then hardening the coating by irradiation of ultraviolet rays or visible light to form the cladding layer.

The present invention is now illustrated in greater detail by reference to the following examples, which, however, are not to be construed as limiting the present invention in any way.

In the examples, all parts and percentages are by weight except the whole light transmittance.

EXAMPLES 1 TO 14 AND COMPARATIVE EXAMPLES 15 TO 19

Production of Polymethyl Methacrylic Polymer

Figure 5:
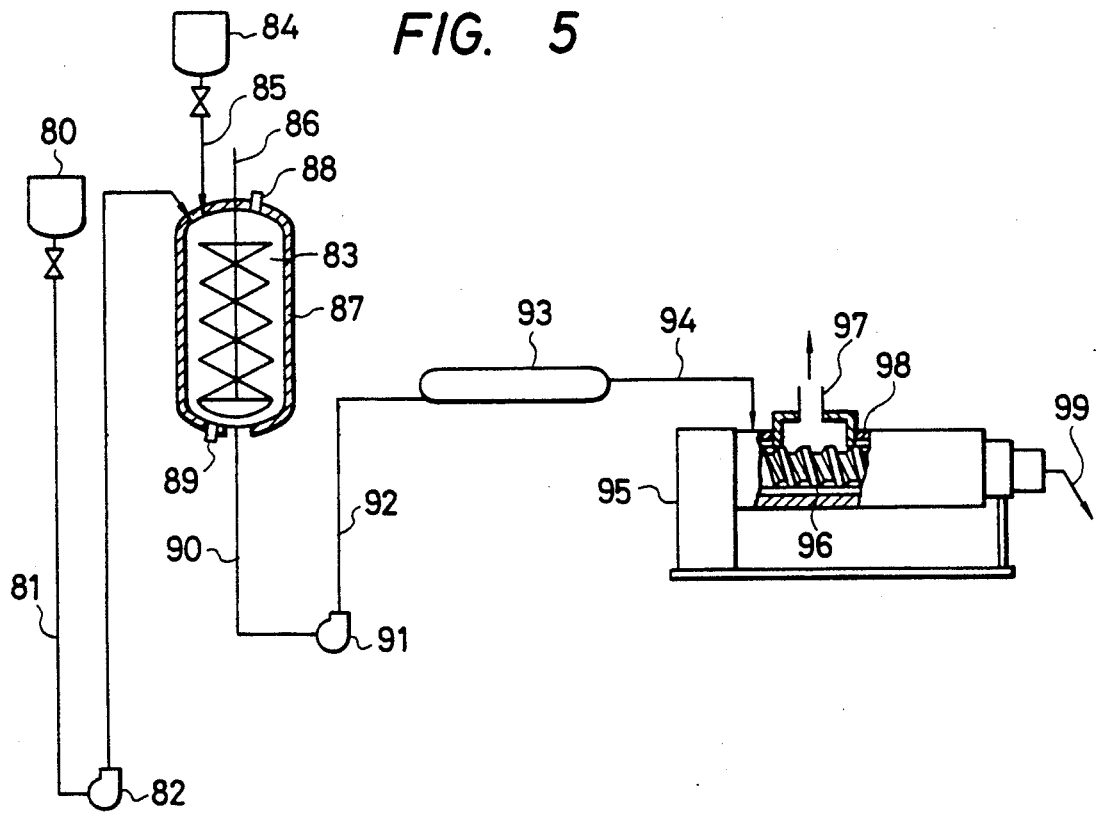
FIG. 5 is a schematic view showing an apparatus for producing various polymethyl methacrylic polymers.

FIG. 5 is a schematic view showing a typical apparatus for producing various methyl methacrylate polymers.

In this invention, the apparatus as shown in FIG. 5 was used. Thus, the preparation of the polymethyl methacrylic polymer is explained by referring to the apparatus of FIG. 5.

A mixture of 100 parts of methyl methacrylate monomer, 0.0017 part of di-tert-butyl peroxide as a polymerization initiator, 0.25 part of dodecylmercaptan, and 0 to 50 parts cf a non-polymerizing solvent (e.g., toluene, etc.,) was supplied to a storage tank 80 and then supplied through a line 81 to a polymerization reaction tank 83 by means of a pump 82 at a flow rate of 3 kg/hr. In this case, an additive such as antioxidant, etc., may be added to the system and the additive was supplied from an additive storage tank 84 through a line 85 to the reaction tank 83. The reaction tank was equipped with a spiral ribbon type stirrer 86 and a jacket 87 and a heat medium was circulated through via openings 88 an 89.

The capacity of the reaction tank was 25 liters and the polymerization reaction temperature could be changed in the range of 60° C. to 190° C. Also, the polymerization conversion could be changed over a range of from 40% to 70%.

The polymethyl methacrylate syrup formed in the polymerization reaction tank 83 was sent through a line 90, a pump 91, and a line 92 to a syrup heating zone 93, wherein the syrup was heated to 200° C. to 240° C. Thereafter, the syrup was sent to a volatile material separator 95 through a line 94, in which unreacted methyl methacrylate monomer and as the case may be, non-polymerizing solvent such as toluene, etc., were partially removed together with volatile materials under the conditions of the vent portion temperature of 190° C. to 250° C. and the reduced pressure of 3 to 500 mm Hg.

The polymethyl methacrylate formed was obtained in the form of strand from a polymer outlet 99 and could be formed into pellets by a cutter, etc.

The volatile matter separator 95 was equipped with a screw 96, a vent 97, and a heating means 98 and employed single-shaft screw vent-type extruder (screw diameter 30 mm, screw length 720 mm, vent length 60 mm).

The polymethyl methacrylic polymer thus obtained still contained impurities, which react with amines and change yellow materials, and the content of the impurities could be changed by the polymerization condition (e.g., the amount of the solvent, the polymerization temperature, the reaction conversion, etc.,), the syrup heating temperature, and the voltaile matter separation faculty.

The content of impurities was measured as follows.

Polymethyl methacrylic polymer (3.3 g) mainly composed of methyl methacrylate was dissolved in acetone (20 ml) and impurities were measured by gas chromatography.

The details of gas chromatography used in the present invention are as follows.

| | |
|---|---|
| Gas chromatograph | JEOL, JGC-206 (manufactured by JEOL LTD.) |
| Liquid phase (stationary phase) | 5% polyethylene-glycol succinate and 1% $H_3PO_4$ aqueous solution |
| Carrier phase | Chromosorb W-AW |
| Stainless column | diameter 3 mm length 2 m |
| Carrier gas | Nitrogen |
| Injection temperature | 150° C. |
| Column temperature | 200° C. |
| Poured amount of sample | 2 μl |
| Sample density | Polymethyl methacrylic polymer 3.3 g per 20 ml of acetone solution |

Production of Polyglutarimide Polymer

FIG. 4 is a schematic view showing a typical apparatus for producing a polyglutarimide polymer, and in this example, the apparatus as shown in FIG. 4 was used. Thus, the production of the polymer is explained by referring to FIG. 4.

100 Parts of the polymethyl methacrylate produced by using the aforesaid apparatus shown in FIG. 5 and dried well was supplied to the 500 liter dissolving tank (numeral 50 of the apparatus shown in FIG. 4) together with 90 parts of toluene which had been dried by dehydration and then purified by filtration using a filter, Fluoropore (trade mark for product made by Sumitomo Electric Industries, Ltd.) of 0.1 μm and 10 parts of methanol which had been dried by dehydration and purified by filtration using a filter, Fluoropore of 0.1 μm and dissolved with stirring at 200° C.

Then, the solution thus obtained was continuously supplied to a 40 liter reaction tank (numeral 60 in FIG. 4) at a feeding rate of 5 kg/hr. and the temperature in the tank was adjusted to 230° C. while well stirring the content at a stirring speed of 90 rpm. Thereafter, desiccated methylamine (imidating agent) was purified by filtration using Fluoropore of 0.1 μm and continuously supplied in the reaction tank to make the inside pressure 25 kg/cm² (gauge pressure). The inside temperature of the reaction tank was kept at 230° C. during the reaction and the mean residence time was kept at 4.5 hours.

The reaction product thus obtained was placed in a 20 liter aging tank (not shown in FIG. 4) by means of a pump and aged with stirring at an inside temperature of 230° C. and a mean residence time of 20 hours.

The aged reaction product was continuously supplied to the single-shaft screw vent type extruder (screw diameter 30 mm, screw length 720 mm, vent length 60 mm), wherein volatile matters were removed. The temperature of the extruder was 230° C. at the vent and extruding portion and the pressure at the vent portion was 9 mm Hg.

The strands of the polymer extruded from the die were cooled by water and cut to provide pellets of the polymer having good transparency.

On the other hand, toluene, methanol, and unreacted amine discharged from the vent portion were cooled and recovered.

The infrared absorption spectra of the polymer thus obtained showed the absorptions specific to the methylmethacrylimide polymer at 1720 cm$^{-1}$, 1663 cm$^{-1}$, and 750 cm$^{-1}$. Also, the nuclear magnetic resonance spectra of the polymer showed the signals showing the aforesaid In the examples, various properties of the polymethyl methacrylic polymers and the polyglutarimide polymers produced were measured in the following manners, respectively.

Properties of Polymethyl Methacrylic Polymer (1) Intrinsic Viscosity

The flowing time (Ts) of a dimethylformamide solution of 0.5% by weight of a sample polymer and the flowing time (To) of dimethylformamide were measured by a Deereax-Bischoff viscometer and the relative viscosity $\eta_{rel}$ of the polymer was obtained from the value of Ts/To. Then, the intrinsic viscosity was calculated by the equation.

$$\text{Intrinsic viscosity} = \ln(\eta_{rel}/C)_{C \to 0}$$

wherein C represents the gram number of the polymer per 100 ml of the solvent.

(2) Yellow Degree (YI$_S$)

The yellow degree (YI$_S$) of a heated polymer composition as solution was measured according to the method of JIS K-7103. That is, after keeping the pellets, which has average diameter of 2 mm and average length of 3 mm, of a polymethyl methacrylic polymer obtained at 150° C. for 15 days in atmospheric condition, the pellets were. dissolved in a 15% methylene chloride solution and the yellow degree. (YI$_S$) was measured by the transmitted light using the aforesaid method, which was defined as heat yellow degree. YI$_S$ was calculated by the following equation.

$$YI_S = \frac{100(1.28X - 1.06Z)}{Y}$$

wherein, X, Y, and Z are tristimulus values of the sample polymer in standard light.

Properties of Polyqlutarimide Polymer (1) Thermal Deformation Temperature

The thermal deformation temperature of the polyglutarimide polymer was measured according to the method of ASTM D648.

(2) Imidation Ratio

The imide ring unit and the polymethyl methacrylic polymer were measured by JNM-FX-100(manufactured by JEOL LTD.) Spectrometer 100 MHz and the amount of the imide ring unit to the total amount of the imide ring unit and the polymethyl methacrylic polymer unit is expressed as a % value.

The polymerization procedures of the examples and properties of the resulting polymers are summarized in Table 1 below.

TABLE 1

| Example | Polymethyl Methacrylic Polymer | Impurities (ppm) | Polymer solution (1) (%) | (2) (kg/hr) | Imidating agent (3) | (4) (mol/hr) | (5) | (6) (°C.) | (7) (%) | (8) (de/g) | Solvent (weight ratio) |
|---|---|---|---|---|---|---|---|---|---|---|---|
| 1 | MMA polymer | 60 | 30 | 2.7 | Methyl amine | 20 | 0.7 | 177 | 98.5 | 0.56 | Toluene/Methanol (90/10) |
| 2 | MMA-MAA copolymer | 130 | 20 | 2.7 | Methyl amine | 20 | 2.7 | 175 | 98.5 | 0.7 | Toluene/Methanol (90/10) |
| 3 | MMA-MA copolymer | 150 | 20 | 2.7 | Methyl amine | 20 | 1.9 | 173 | 97.0 | 0.35 | Toluene/Methanol (90/10) |
| 4 | MMA-AA copolymer | 70 | 30 | 2.7 | Methyl amine | 20 | 0.8 | 175 | 97.0 | 0.6 | Toluene/Methanol (90/10) |
| 5 | MMA-BA copolymer | 170 | 30 | 2.7 | Methyl amine | 20 | 2.3 | 159 | 73.0 | 1.0 | Toluene/Methanol (90/10) |
| 6 | MMA-BMA-MAA copolymer | 80 | 20 | 2.7 | Methyl amine | 20 | 1.0 | 160 | 77.0 | 0.65 | Toluene/Methanol (90/10) |
| 7 | MMA-t-BA-t-BMA copolymer | 100 | 30 | 2.7 | Methyl amine | 20 | 1.2 | 163 | 78.0 | 1.05 | Toluene/Methanol (90/10) |

TABLE 1-continued

| Example | Polymethyl Methacrylic Polymer | Impurities (ppm) | Polymer solution (1) (%) | (2) (kg/hr) | Imidating agent (3) | (4) (mol/hr) | (5) | (6) (°C.) | (7) (%) | (8) (de/g) | Solvent (weight ratio) |
|---|---|---|---|---|---|---|---|---|---|---|---|
| 8 | MMA-t-BA copolymer | 80 | 30 | 2.7 | Methyl amine | 20 | 1.0 | 159 | 77.0 | 0.55 | Toluene/Methanol (90/10) |
| 9 | MMA-ST copolymer | 50 | 30 | 2.7 | Methyl amine | 20 | 0.5 | 155 | 70.0 | 0.6 | Toluene/Methanol (90/10) |
| 10 | MMA-BZMA copolymer | 30 | 30 | 2.7 | Methyl amine | 20 | 0.4 | 175 | 97.0 | 0.65 | Toluene/Methanol (90/10) |
| 11 | MMA-CHMA copolymer | 50 | 30 | 2.7 | Methyl amine | 20 | 0.6 | 173 | 96.0 | 0.6 | Toluene/Methanol (90/10) |
| 12 | MMA copolymer | 30 | 50 | 2.0 | Methyl amine | 1.0 | 0.3 | 135 | 45.0 | 0.56 | Toluene/Methanol (90/10) |
| 13 | MMA copolymer | 50 | 50 | 2.0 | Methyl amine | 5.0 | 0.5 | 155 | 65.0 | 0.56 | Toluene/Methanol (90/10) |
| 14 | MMA copolymer | 60 | 50 | 2.0 | Methyl amine | 10 | 0.4 | 165 | 75.0 | 0.56 | Toluene/Methanol (90/10) |
| 15* | MMA copolymer | 2500 | 30 | 2.7 | Methyl amine | 20 | 10.0 | 175 | 97.0 | 0.56 | Toluene/Methanol (90/10) |
| 16* | MMA copolymer | 1900 | 30 | 2.7 | Methyl amine | 20 | 7.0 | 176 | 98.0 | 0.56 | Toluene/Methanol (90/10) |
| 17* | MMA copolymer | 1730 | 30 | 2.7 | Methyl amine | 20 | 6.0 | 176 | 98.0 | 0.56 | Toluene/Methanol (90/10) |
| 18* | MMA copolymer | 1500 | 50 | 2.0 | Methyl amine | 1.0 | 5.0 | 114 | 46.0 | 0.56 | Toluene/Methanol (90/10) |
| 19* | MMA copolymer | 1030 | 30 | 2.0 | Methyl amine | 20 | 3.4 | 176 | 98.0 | 0.56 | Toluene/Methanol (90/10) |

(1): Concentration
(2): Feed Rate
(3): Kind
(4): Feed Rate
(5): Heat Coloring Degree (YIs)
(6): Heat Deformation Temp.
(7): Imidation Ratio
(8): Intrinsic Viscosity of Polymethyl Methacrylic Polymer
MMA: methylmethacrylate
MAA: methaclic acid
AA: acrylic acid
BA: butyl acrylate
t-BA: t-butyl acrylate
t-BMA: t-butyl methacrylate
ST: stylene
BZMA: benzyl methacrylate
CHMA: cyclohexyl methacrylate
*Comparative Example

Production of Optical Fibers

Using the apparatus shown in FIGS. 2 and 3, polyglutarimide series core-clad optical fibers having an outer diameter of 1 mm and the cladding layer thickness of 15 mm were produced.

As the cladding material, a copolymer composed of 90 parts by weight of 2,2,2-trifluoroethyl methacrylate, 8 parts by weight of methyl methacrylate, and 2 parts by weight of methacrylic acid was used.

The light transmission characteristic and the heat-resisting light transmission characteristic of the core-clad plastic optical fibers thus obtained were measured.

The light transmission characteristic of the optical fibers was measured according to the apparatus shown in FIG. 4 of Japanese Patent Application (OPI) No. 7602/83 (the term "OPI" as used herein means a "published unexamined Japanese patent application") and addition, the measurement conditions were as follows.
Measurement Wavelength: 350 to 1,200 nm
$l_o$ (Full length of fiber): 5 m
$l$ (Cut length of fiber): 4 m
P (Diameter of bobbin): 190 mm The light transmission characteristic was indicated by light transmission loss (dB/km).

Also, the heat-resistant light transmission characteristic was measured as follows. Plastic optical fibers produced were set in a tank kept at 130° C. in the measurement length, both ends of the optical fiber were protruded from the tank, measurement light was passed through the fiber, and the light transmission loss was measured according to the aforesaid measurement method.

The results obtained are shown in Table 2 together with the materials used for producing the plastic optical fibers, etc.

TABLE 2

| | | Light Transmission Loss (dB/km) | |
|---|---|---|---|
| Ex. No. | Polymethyl Methacrylic Polymer | 655 nm | 130° C., 1,000 hrs. 655 nm |
| 1 | MMA polymer | 220 | 350 |
| 2 | MMA-MAA copolymer | 310 | 450 |
| 3 | MMA-MA copolymer | 350 | 450 |
| 4 | MMA-AA copolymer | 260 | 420 |
| 5 | MMA-BA copolymer | 370 | 450 |
| 6 | MMA-BMA-MAA copolymer | 280 | 430 |

TABLE 2-continued

| Ex. No. | Polymethyl Methacrylic Polymer | Light Transmission Loss (dB/km) 655 nm | 130° C., 1,000 hrs. 655 nm |
|---|---|---|---|
| 7 | MMA-t-BA-t-BMA copolymer | 300 | 450 |
| 8 | MMA-t-BA copolymer | 280 | 430 |
| 9 | MMA-ST copolymer | 260 | 420 |
| 10 | MMA-BZMA copolymer | 270 | 430 |
| 11 | MMA-CHMA copolymer | 270 | 435 |
| 12 | MMA polymer | 190 | 300 |
| 13 | " | 200 | 330 |
| 14 | " | 210 | 350 |
| 15* | " | 850 | 9500 |
| 16* | " | 770 | 7700 |
| 17* | " | 730 | 7000 |
| 18* | " | 700 | 5500 |
| 19* | " | 680 | 5000 |

As is apparent from the results of Table 2, the core-clad plastic optical fiber of the present invention comprising the polyglutarimide polymer can have excellent light-transmission characteristics at a high temperature atmosphere for a long time as well as at an ordinary temperature atmosphere.

While the invention has been described in detail and with reference to specific embodiments thereof, it will be apparent to one skilled in the art that various changes and modifications can be made therein without departing from the spirit and scope thereof.

What is claimed is:

1. A core-clad plastic optical fiber comprising
(a) a polyglutarimide series polymer having a polymeric structural unit represented by formula (I)

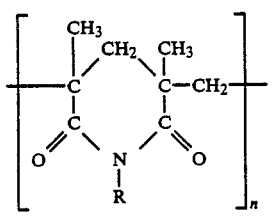

(I)

wherein R represents a hydrogen atom, an alkyl group, a cycloalkyl group, or an aromatic group and n represents a positive integer, having a thermal deformation temperature of at least 120° C. as a core, and
(b) an organic polymer having a refractive index lower than the refractive index of the core as a cladding layer, said plastic optical fiber having the characteristic that the light transmission loss measured at 655 nm is not more than 500 dB/km, wherein the polyglutarimide series polymer forming the core is a polymer produced by solution polymerization using an aromatic hydrocarbon solvent selected from benzene, toluene, ethylbenzene and xylene under the polymerization temperature of 60° C. to 140° C. and has a $YI_S$ value of not more than 3 in a mixed solvent of said aromatic hydrocarbon and methanol, reacting polymethyl methacrylate polymer solution with an amine represented by formula (II)

R'—NH$_2$     (II)

wherein R' represents a hydrogen atom, an alkyl group, a cycloalkyl group, or an aromatic group, and then removing volatile components in the reaction system, wherein said polymethyl methacrylic polymer contains not more than 500 ppm of impurities, measured by gas chromatography, which react with the amine shown by formula (II) to form yellow materials.

2. A core-clad plastic optical fiber as in claim 1, wherein the light transmission loss of the plastic optical fiber at 655 nm after heat-treating the optical fiber at 130° C. for 1,000 hours is not more than 500 dB/km.

3. A core-clad plastic optical fiber as in claim 1, wherein the $YI_S$ value of the polymethyl methacrylic polymer is from 0.1 to 1.

4. A core-clad plastic optical fiber as in claim 1, wherein the reaction of the polymethyl methacrylic polymer and the amine represented by formula (II) for producing the polyglutarimide polymer is performed in an organic solvent solution containing from 30 to 80% by weight of the polymethyl methacrylic polymer.

5. A core-clad plastic optical fiber as in claim 4, wherein the solvent for dissolving the polymethyl methacrylic polymer is a mixed solvent of an aliphatic alcohol and an aromatic hydrocarbon having a weight mixing ratio of 1/99 to 80/20.

6. A core-clad plastic optical fiber as in claim 5, wherein the organic solvent is an aromatic hydrocarbon.

7. A core-clad plastic optical fiber as in claim 5, wherein the aliphatic alcohol is methanol.

* * * * *